(12) United States Patent
Foo et al.

(10) Patent No.: US 10,058,820 B2
(45) Date of Patent: Aug. 28, 2018

(54) PIPING ARRANGEMENT FOR A WATER PURIFICATION APPARATUS

(71) Applicants: Chin Jin Foo, Ipoh (MY); Kok Sing Goh, Ipoh (MY)

(72) Inventors: Chin Jin Foo, Ipoh (MY); Kok Sing Goh, Ipoh (MY)

( * ) Notice: Subject to any disclaimer, the term of this patent is extended or adjusted under 35 U.S.C. 154(b) by 0 days.

(21) Appl. No.: 15/054,088

(22) Filed: Feb. 25, 2016

(65) Prior Publication Data

US 2017/0001145 A1 Jan. 5, 2017

(30) Foreign Application Priority Data

Jul. 3, 2015 (MY) .......................... PI 2015001733

(51) Int. Cl.
*B01D 61/10* (2006.01)
*B01D 61/12* (2006.01)
*B01D 61/02* (2006.01)
*B01D 61/00* (2006.01)

(52) U.S. Cl.
CPC ............. *B01D 61/10* (2013.01); *B01D 61/00* (2013.01); *B01D 61/025* (2013.01); *B01D 61/12* (2013.01); *B01D 2311/10* (2013.01); *B01D 2311/14* (2013.01); *B01D 2313/105* (2013.01); *B01D 2313/125* (2013.01)

(58) Field of Classification Search
CPC ...... B01D 61/10; B01D 61/025; B01D 61/12; B01D 2311/10; B01D 2311/14; B01D 2313/105; B01D 2313/125
USPC .......................................................... 210/85
See application file for complete search history.

(56) References Cited

U.S. PATENT DOCUMENTS

| | | | |
|---|---|---|---|
| 2008/0164209 A1* | 7/2008 | Zacerkowny | B01D 61/025 210/652 |
| 2013/0146514 A1* | 6/2013 | Reeves | B01D 61/022 210/106 |
| 2014/0048462 A1* | 2/2014 | Cohen | B01D 61/12 210/96.2 |

* cited by examiner

*Primary Examiner* — Robert Clemente
*Assistant Examiner* — Akash K Varma
(74) *Attorney, Agent, or Firm* — Maschoff Brennan

(57) ABSTRACT

A piping arrangement for a water purification apparatus that utilizes a number of manifolds and pipes to replicate the piping system of a water purification apparatus in a more compact manner. Metal pipes are joined to manifolds using elastomeric ring connections. Each manifold is designed with internal conduits that replicate the path of pipes in a water purification system.

7 Claims, 1 Drawing Sheet

PIPING ARRANGEMENT FOR A WATER PURIFICATION APPARATUS

FIELD OF INVENTION

The present invention relates generally to reverse osmosis water purification systems, and more specifically to a piping arrangement for reverse osmosis water purification systems.

BACKGROUND OF INVENTION

Reverse Osmosis water purification systems are well known in the art. They produce purified water, and in more stringent systems, can even be used in applications where hygiene is a primary concern, such as the medical and food preparation industries. Partly due to the high pressures required in these reverse osmosis water purification systems, a somewhat extensive network of pipes and connections is needed. This makes the apparatus large and bulky. Some reverse osmosis systems take up entire rooms.

Another disadvantage of having a large amount of piping is the high bio burden in the piping system, whereby organisms such as microbes accumulate along the insides of the pipes.

The current method of joining the various pipes is by way of glueing the pipes at the joints. This makes the installation more difficult and requiring more skilled people to install.

What is needed in the art is a reverse osmosis piping arrangement that is able to handle the high pressures associated with reverse osmosis water purification without leaking, and that is at the same time compact and easy to maintain. What is also needed is a piping arrangement that is easy to install.

SUMMARY OF INVENTION

The present invention seeks to overcome the aforementioned disadvantages by providing a piping arrangement for a reverse osmosis (RO) water purification apparatus that utilizes a number of manifolds and pipes to replicate the piping system of a reverse osmosis water purification apparatus in a more compact manner. Metal pipes are joined to manifolds using elastomeric ring connections. The joints are plug and play, wherein there is no need for glueing the joints together. Each manifold is designed with internal conduits that replicate the path of a typical RO water purification system.

This invention thus relates to a piping arrangement for a reverse osmosis (RO) water purification apparatus, comprising: a raw water inlet pipe, with an outside end in fluid communication with a raw water source, said raw water inlet pipe provided with a solenoid valve along its length; a first manifold having an inner hollow forming a plurality of fluid conduits between: a raw water intake; a return loop intake; a recirculation intake; and a pump outlet, said raw water intake in fluid communication with an inside end of said raw water inlet pipe, and a conductivity sensor provided along a said fluid conduit that is adjacent to said pump outlet; a pump outlet pipe with an inside end in fluid communication with said pump outlet, and an outside end in fluid communication with an input of a main pressure pump; a water return inlet pipe with an outside end in fluid communication with a return pipe of an external use; a second manifold having an inner hollow forming a fluid conduit between: a return loop inlet and a return loop outlet; a joining pipe located between the said return loop outlet in the said second manifold and the said return loop intake of said first manifold for providing a flow of fluid from the said second manifold to the said first manifold, said joining pipe provided with a first non-return valve that prevents fluid from flowing in a reverse direction; a pump inlet pipe with an outside end in fluid communication with an output of said main pressure pump; a third manifold having an inner hollow forming a fluid conduit between: a pump inlet and a membrane outlet, said pump inlet in fluid communication with an inside end of said pump inlet pipe; a membrane outlet pipe with an inside end in fluid communication with said membrane outlet, and an outside end in fluid communication with a high pressure side of a reverse osmosis membrane; a permeate inlet pipe, with an outside end in fluid communication with a low pressure side of said reverse osmosis membrane; a fourth manifold having an inner hollow forming a fluid conduit between: a permeate inlet and a permeate outlet, having along said fluid conduit, a flow sensor and a pressure sensor, said permeate inlet in fluid communication with an inside end of said permeate inlet pipe; a permeate outlet pipe with an inside end in fluid communication with said permeate outlet, and an outside end in fluid communication with a delivery network for an external use; a concentrate inlet pipe having an outside end in fluid communication with a high pressure side of said reverse osmosis membrane; a fifth manifold having an inner hollow forming a plurality of fluid conduits between: a concentrate inlet, a recirculation outlet and a concentrate outlet, said concentrate inlet having adjacent to it a conductivity sensor and a temperature sensor, and said concentrate outlet having adjacent to it a flow sensor and a concentrate flow control valve; a recirculation pipe having a first end in fluid communication with said recirculation intake of first manifold and a second end in fluid communication with said recirculation outlet for fifth manifold; a concentrate outlet pipe with an inside end in fluid communication with said concentrate outlet of said fifth manifold, and an outside end in fluid communication with a drainage outlet, said drainage outlet in fluid communication with an external means of disposal.

The present invention also relates to a piping arrangement for a reverse osmosis (RO) water purification apparatus wherein the said pressure sensor measures the pressure of the permeate to allow the system electronics to control a variable frequency drive unit which in turn controls the main RO pressure pump.

The present invention also relates to a piping arrangement for a reverse osmosis (RO) water purification apparatus wherein the said temperature sensor for fifth manifold measures the concentrate water temperature, whereupon if the measured temperature exceeds a pre-determined value, the concentrate water will be discharged to drain.

The present invention also relates to a piping arrangement for a reverse osmosis (RO) water purification apparatus wherein the said concentrate flow control valve is provided in the fifth manifold in order to control the flow of the concentrate based on the said measurements of conductivity and temperature determined by the said conductivity sensor and temperature sensor of the fifth manifold.

Other objects and advantages will be more fully apparent from the following disclosure and appended claims.

DETAILED DESCRIPTION OF INVENTION

Figure 1:
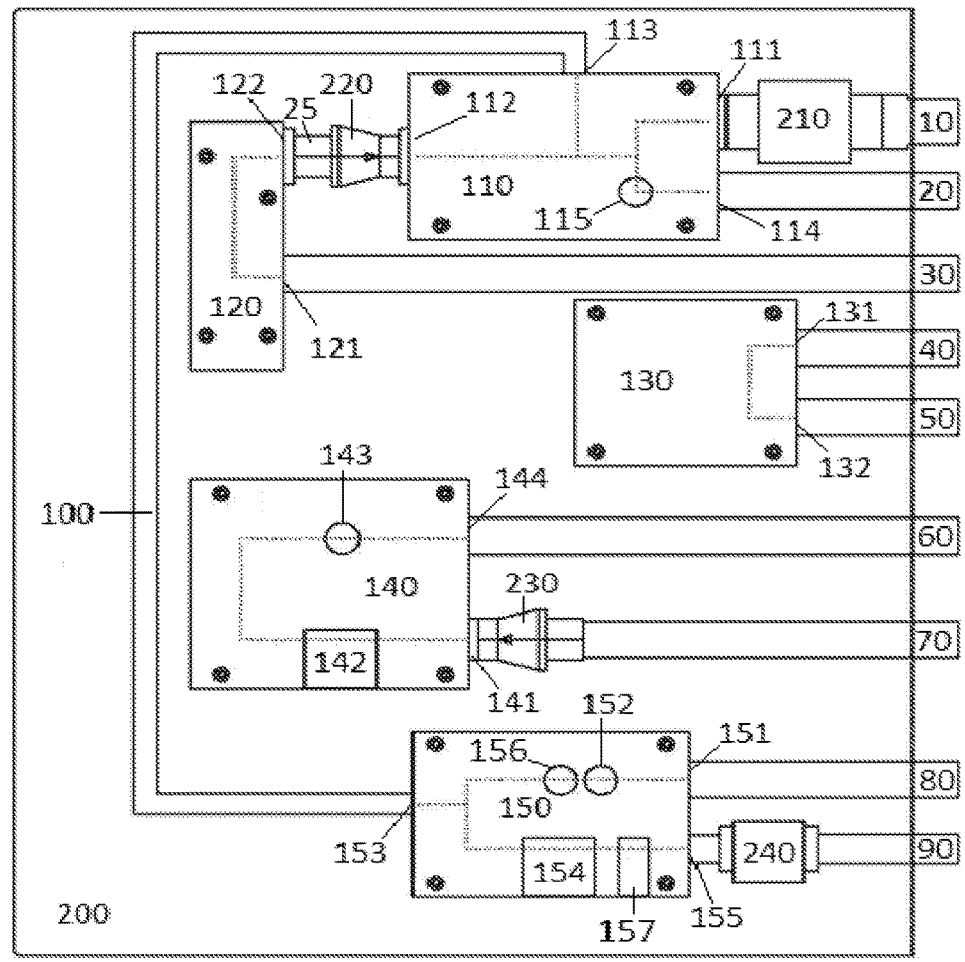
FIG. 1 shows a plan view of a piping arrangement in an embodiment of the present invention.

It should be noted that the following detailed description is directed to a piping arrangement for a reverse osmosis water purification system, and is not limited to any particular size or configuration but in fact a multitude of sizes and configurations within the general scope of the following description.

LIST OF NUMBERED ELEMENTS IN FIGURES

Raw water inlet pipe (10)
Pump outlet pipe (20)
Joining pipe (25)
Water return inlet pipe (30)
Pump inlet pipe (40)
Membrane outlet pipe (50)
Permeate outlet pipe (60)
Permeate inlet pipe (70)
Concentrate inlet pipe (80)
Threaded end of pipe (82)
Concentrate outlet pipe (90)
Recirculation pipe (100)
First manifold (110)
Raw water intake of first manifold (111)
Return loop intake of first manifold (112)
Recirculation intake of first manifold (113)
Pump outlet of first manifold (114)
Conductivity sensor (115)
Second manifold (120)
Return loop inlet for second manifold (121)
Return loop outlet for second manifold (122)
Third manifold (130)
Pump inlet for third manifold (131)
Membrane outlet for third manifold (132)
Fourth manifold (140)
Permeate inlet for fourth manifold (141)
Flow sensor for fourth manifold (142)
Pressure sensor for fourth manifold (143)
Permeate outlet for fourth manifold (144)
Fifth manifold (150)
Concentrate inlet for fifth manifold (151)
Conductivity sensor for fifth manifold (152)
Recirculation outlet for fifth manifold (153)
Flow sensor for fifth manifold (154)
Concentrate outlet for fifth manifold (155)
Temperature sensor for fifth manifold (156)
Concentrate flow control valve (157)
Skid plate (200)
First solenoid valve (210)
First non-return valve (220)
Second non-return valve (230)
Second solenoid valve (240)
Inner elastomeric ring (250)
Outer elastomeric ring (252)
Inner nut (260)
Outer nut (262)
Screws (270)

Referring to FIG. 1, there is shown a plan, diagrammatical view of a piping arrangement for a reverse osmosis (RO) water purification system. This piping arrangement is a number of pipes and manifolds, built onto a plate (200), which functions to join the various components of a reverse osmosis water purification system. Raw feed water from an external source enters a raw water inlet pipe (10). Along the raw water inlet pipe (10) is a first solenoid valve (210). After the said solenoid valve (110), the raw water inlet pipe (10) is connected to a raw water intake of a first manifold (111). The first manifold (110) comprises an inner hollow forming conduits, shown as a dotted line in FIG. 1, in which a fluid may pass freely. In the first manifold (110), these conduits connect the said raw water intake of first manifold (111) to a return loop intake of first manifold (112), a recirculation intake of first manifold (113), and a pump outlet of first manifold (114). A conductivity sensor (115) is provided adjacent to the said pump outlet of first manifold (114) for reading inlet water quality. In this way, raw water entering the first manifold (110) is channeled to the pump outlet of first manifold (114), and out via a pump outlet pipe (20). This pump outlet pipe (20) is connected to the intake of the main pressure pump of the RO water purification system. The function of the first solenoid valve (210) is to control raw water flowing into the main pressure pump when the system is in a RUN mode. In this way, when the system is not running, water does not flow through the main pump.

Water return inlet pipe (30) connects an RO water return loop to a return loop inlet for second manifold (121) located at a second manifold (120). This return water then passes through said second manifold (120) and leaves it via a return loop outlet for second manifold (122). This same water then passes through a joining pipe (25) located between the said return loop outlet of second manifold (122) and the said return loop intake of first manifold (112). A first non-return valve (220) located along the said joining pipe (25) prevents the water from flowing in a reverse direction. This water then enters the first manifold (110) via the return loop intake of first manifold (112). In this way, this return water is channeled back to the first manifold (110).

The water return loop is connected to piping that is ultimately connected to a RO permeate (product) water outlet of this RO water purification apparatus. This may happen after the water is supplied to an external use, such as a dialysis centre. The loop is usually 50 m to 200 m long depending on the size of the dialysis centre. The return loop must be connected back to the system to prevent dead leg (stagnant water) should any of the water points become un-used for an extended amount of time.

Water from the said main pressure pump of the RO water purification system flows through a pump inlet pipe (40) into a third manifold (130) via a pump inlet for third manifold (131). The third manifold (130) comprises an inner hollow forming a conduit, shown as a dotted line in FIG. 1, in which a fluid may pass freely. In the third manifold (130), these conduits connect the said pump inlet for third manifold (131) to a membrane outlet for third manifold (132). In this way, pressurized water entering the third manifold (130) is channeled out a membrane outlet for third manifold (132) into a membrane outlet pipe (50). This membrane outlet pipe (50) is further connected to a high pressure side of an RO membrane.

In a typical RO water purification system, pressurized fluid on one side of a membrane permeates through the membrane into the side of the membrane with a lower pressure but higher dilution. The fluid that is left on the higher pressure side of the membrane becomes the "concentrate", and the fluid that has permeated across the membrane is of lower pressure and higher dilution, and is known as the "permeate".

Still referring to FIG. 1, there is shown a permeate inlet pipe (70). Permeate water from the said lower pressure side of the membrane is channeled into this permeate inlet pipe (70). This permeate then flows through a second non-return valve (230), which prevents the permeate from flowing in a reverse direction. The permeate then flows into a fourth manifold (140) via a permeate inlet for fourth manifold (141). This fourth manifold (140) comprises a permeate inlet for fourth manifold (141) and a permeate outlet for fourth manifold (144), joined to each other by an inner conduit shown as a dotted line in FIG. 1. Along this inner conduit, and from the permeate inlet for fourth manifold (141) and a permeate outlet for fourth manifold (144), there is provided a flow sensor for fourth manifold (142) and then a pressure sensor for fourth manifold (143). In this way, the permeate is channeled from the said permeate inlet pipe (70), through the fourth manifold (140), and out via the permeate outlet for fourth manifold (144) into a permeate outlet pipe (60). This permeate outlet pipe (60) of product water is then connected to a delivery for an external use. The pressure sensor (143) measures the pressure of the permeate to allow the system electronics to control a variable frequency drive unit which in turn controls the main RO pressure pump, thereby regulating the permeate pressure. This allows the system to reduce pump power when water demand is low and to increase the pump power when demand is high. The pressure pump power calculations are done by a microcomputer software. The thresholds of pressure levels may be user set.

To reduce power usage, the system utilizes a pressure sensor to monitor the loop pressure or the loop return pressure. The loop pressure is preset to a fix value. The power of the RO pressure pump is controlled via a variable frequency inverter to maintain the loop pressure. This allows the system do reduce the pump power when water demand is low and to increase the RO pressure pump power when the demand is high. All the RO pressure pump power calculations is done by a microcomputer software running the system.

From the high pressure side of the said membrane, the concentrate is channeled into a concentrate inlet pipe (80). This concentrate inlet pipe (80) is further connected to a fifth manifold (150) via a concentrate inlet for fifth manifold (151). This fifth manifold (150) comprises the said concentrate inlet for fifth manifold (151) connected to two other openings—a recirculation outlet for fifth manifold (153) and a concentrate outlet for fifth manifold (155)—via an inner hollow forming a 3-way conduit, which is essentially 3 conduits joining at a point. Between the concentrate inlet for fifth manifold (151) and the said point, there is provided a conductivity sensor for fifth manifold (152). Between the said point and the concentrate outlet for fifth manifold (155), there is provided a flow sensor for fifth manifold (154), there is provided a flow sensor (154). This flow sensor (154) is used for monitoring the concentrate flow rate to ensure the concentrate flow rate is about the same as the permeate water output rate. A concentrate flow control valve (157) is used to control the amount of concentrate water being rejected to drain during a non re-circulate mode, that is, when the concentrate is not being channeled back through the recirculation pipe (100). In this way, the said concentrate is channeled from the concentrate inlet pipe (80) into the fifth manifold (150) and split into two channels. The first of these said channels exit the fifth manifold (150) via the concentrate outlet for fifth manifold (155) and into a concentrate outlet pipe (90), where it passes through a second solenoid valve (240) before being flushed out into an external drain as waste. The second of these said channels exit the fifth manifold (150) via the recirculation outlet for fifth manifold (153) into a recirculation pipe (100) which channels the said concentrate back to the recirculation intake of first manifold (113) and hence into the first manifold (110). The conductivity sensor (152) measures the conductivity of the concentrate to allow the system electronics to determine if the concentrate should be sent to the recirculation pipe (100) to be recycled, or flushed out into a drain. When the system determines that the concentrate is of good enough quality, the second solenoid valve (240) is shut, and concentrate is then channeled into the recirculation pipe (100) and back to the first manifold (110) to be recycled. When the system determines that the concentrate is of poor quality, the second solenoid valve (240) is opened, and concentrate is then channeled into the concentrate outlet pipe (90) where it is then flushed out of the system. In this way, more of the concentrate water is saved. The thresholds of conductivity levels may be user set. A temperature sensor for fifth manifold (156) measures the concentrate water temperature. If the measured temperature exceeds a pre-determined value, the concentrate water will be discharged to drain. System software determines when to discard the concentrate and when to re-circulate the concentrate water back in to the system. A concentrate flow control valve (157) is provided in the fifth manifold (150) in order for the system software to control the flow of the concentrate based on the measurements of conductivity and temperature.

In order to secure each manifold to the plate (200), a number of corrosion resistance screws (270) are used.

Figure 2:
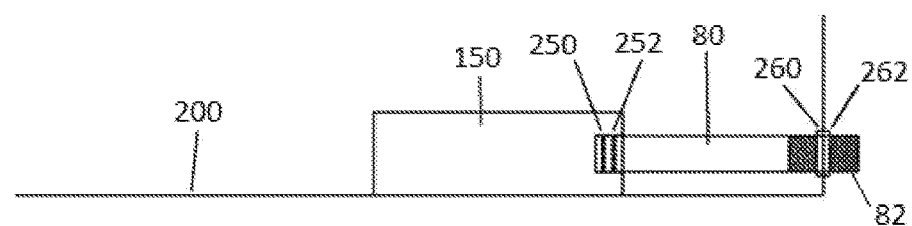
FIG. 2 shows a side view of a piping arrangement in an embodiment of the present invention.

Referring to FIG. 2, there is shown a side view of a piping arrangement of the present invention. This figure illustrates more clearly the way in which the pipes are joined and fitted to the manifolds, and how each is attached to the plate (200). There can be seen a side view of the fifth manifold (150) of FIG. 1. A specific example of how the concentrate inlet pipe (80) connecting to the fifth manifold (150) is shown here, but it is representative of all the other connections between pipes and manifolds of this invention. The connection between pipes and manifolds in this invention is by the use of elastomeric rings. There is shown concentrate inlet pipe (80) having an inner elastomeric ring (250) and an outer elastomeric ring (252) placed into appropriate grooves located on the outer rim of the pipe (80) near an end that is closer to the manifold (150). These inner and outer elastomeric rings provide a leak-proof connection that is able to withstand very high pressures, and restricts the leakage of fluid from the manifold (150) and pipe (80) joint.

Plate (200) is formed in an "L-shape", that is a flat sheet bent or otherwise worked to achieve two surfaces perpendicular to each other. One of the surfaces has a larger surface area that the other. The surface with a smaller surface area is machined with openings slightly larger than the outer diameter of the pipe (80). At the end of the pipe (80) further from the manifold (150), the pipe is threaded (82). This thread allows an inner nut (260) and an outer nut (262), each having an outer diameter larger than said opening of plate, to be screwed towards each other on either side of said plate (200), thus sandwiching the plate (200). This has the effect of securing the said pipe (80) at the desired location.

In an embodiment of the present invention, all the pipes are constructed of metal.

In an embodiment of the present invention, all the manifolds are constructed of metal.

While several particularly preferred embodiments of the present invention have been described and illustrated, it should now be apparent to those skilled in the art that various changes and modifications can be made without departing from the spirit and scope of the invention. Accordingly, the following claims are intended to embrace such changes, modifications, and areas of application that are within the scope of this invention.

The invention claimed is:

1. A piping arrangement configured to be coupled to a reverse osmosis (RO) water purification apparatus that is external to the piping arrangement, the piping arrangement comprising:
  a raw water inlet pipe, with an outside end in fluid communication with a raw water source, said raw water inlet pipe provided with a solenoid valve along its length;
  a first manifold having an inner hollow forming a plurality of fluid conduits between: a raw water intake; a return loop intake; a recirculation intake; and a pump outlet, said raw water intake in fluid communication with an inside end of said raw water inlet pipe, and a conductivity sensor provided along a said fluid conduit that is adjacent to said pump outlet;
  a pump outlet pipe with an inside end in fluid communication with said pump outlet, and an outside end in fluid communication with an input of a main pressure pump;
  a water return inlet pipe with an outside end in fluid communication with a return pipe of an external use;
  a second manifold having an inner hollow forming a fluid conduit between: a return loop inlet and a return loop outlet;
  a joining pipe located between said return loop outlet in said second manifold and said return loop intake of said first manifold for providing a flow of fluid from said second manifold to said first manifold, said joining pipe provided with a first non-return valve that prevents fluid from flowing in a reverse direction;
  a pump inlet pipe with an outside end in fluid communication with an output of said main pressure pump;
  a third manifold having an inner hollow forming a fluid conduit between: a pump inlet and a membrane outlet, said pump inlet in fluid communication with an inside end of said pump inlet pipe;
  a membrane outlet pipe with an inside end in fluid communication with said membrane outlet, and an outside end in fluid communication with a high pressure side of a reverse osmosis membrane of the RO water purification apparatus, wherein the RO water purification apparatus and its reverse osmosis membrane are external to the piping arrangement;
  a permeate inlet pipe, with an outside end in fluid communication with a low pressure side of said reverse osmosis membrane;
  a fourth manifold having an inner hollow forming a fluid conduit between: a permeate inlet and a permeate outlet, having along said fluid conduit, a flow sensor and a pressure sensor, said permeate inlet in fluid communication with an inside end of said permeate inlet pipe;
  a permeate outlet pipe with an inside end in fluid communication with said permeate outlet, and an outside end in fluid communication with a delivery network for an external use;
  a concentrate inlet pipe having an outside end in fluid communication with a high pressure side of said reverse osmosis membrane;
  a fifth manifold having an inner hollow forming a plurality of fluid conduits between: a concentrate inlet, a recirculation outlet and a concentrate outlet, said concentrate inlet having adjacent to it a conductivity sensor and a temperature sensor, and said concentrate outlet having adjacent to it a flow sensor and a concentrate flow control valve;
  a recirculation pipe having a first end in fluid communication with said recirculation intake of first manifold and a second end in fluid communication with said recirculation outlet for fifth manifold; and
  a concentrate outlet pipe with an inside end in fluid communication with said concentrate outlet of said fifth manifold, and an outside end in fluid communication with a drainage outlet, said drainage outlet in fluid communication with an external means of disposal,
  wherein none of the first, second, third, fourth, or fifth manifolds includes a filter membrane.

2. A piping arrangement for a reverse osmosis (RO) water purification apparatus, according to claim 1, wherein a pressure measured by said pressure sensor is used to control a variable frequency drive unit which in turn controls the main RO pressure pump.

3. A piping arrangement for a reverse osmosis (RO) water purification apparatus, according to claim 1, wherein a concentrate water temperature measured by said temperature sensor for fifth manifold is used to control drainage of the concentrate water.

4. A piping arrangement for a reverse osmosis (RO) water purification apparatus, according to claim 1, wherein said concentrate flow control valve is provided in the fifth manifold in order to control the flow of the concentrate based on said measurements of conductivity and temperature determined by said conductivity sensor and temperature sensor of the fifth manifold.

5. A piping arrangement for a reverse osmosis (RO) water purification apparatus, according to claim 1, wherein said raw water inlet pipe, pump outlet pipe, joining pipe, water return inlet pipe, pump inlet pipe, membrane outlet pipe, permeate outlet pipe, permeate inlet pipe, concentrate inlet pipe, concentrate outlet pipe and recirculation pipe are joined to their respective manifolds by having a pair of elastomeric rings located in grooves provided on said pipes, said elastomeric rings forming a water tight seal between said pipes and said manifolds.

6. A piping arrangement for a reverse osmosis (RO) water purification apparatus, according to claim 1, wherein said raw water inlet pipe, pump outlet pipe, joining pipe, water return inlet pipe, pump inlet pipe, membrane outlet pipe, permeate outlet pipe, permeate inlet pipe, concentrate inlet pipe, concentrate outlet pipe and recirculation pipe are constructed of metal.

7. A piping arrangement for a reverse osmosis (RO) water purification apparatus, according to claim 1, wherein said solenoid valve is configured to control raw water flowing into the main pressure pump.

* * * * *